United States Patent [19]
Longacre, Jr.

[11] Patent Number: 5,773,806
[45] Date of Patent: Jun. 30, 1998

[54] METHOD AND APPARATUS FOR CAPTURING A DECODABLE REPRESENTATION OF A 2D BAR CODE SYMBOL USING A HAND-HELD READER HAVING A 1D IMAGE SENSOR

[75] Inventor: Andrew Longacre, Jr., Skaneateles, N.Y.

[73] Assignee: Welch Allyn, Inc., Skaneateles Falls, N.Y.

[21] Appl. No.: 504,643

[22] Filed: Jul. 20, 1995

[51] Int. Cl.[6] .................................................. G06K 07/10
[52] U.S. Cl. ........................................ 235/462; 235/472
[58] Field of Search .................................... 235/462, 472, 235/454, 463, 470

[56] References Cited

U.S. PATENT DOCUMENTS

| | | | |
|---|---|---|---|
| 4,634,850 | 1/1987 | Pierce et al. | 235/462 |
| 4,794,239 | 12/1988 | Allais | 235/462 |
| 5,023,922 | 6/1991 | Abramovitz et al. | 235/462 |
| 5,235,167 | 8/1993 | Dvorkis et al. | 235/462 |
| 5,276,315 | 1/1994 | Surka | 235/462 |
| 5,291,008 | 3/1994 | Havens et al. | 235/462 |
| 5,294,783 | 3/1994 | Hammond et al. | 235/462 |
| 5,304,786 | 4/1994 | Pavlidis et al. | 235/462 |
| 5,343,026 | 8/1994 | Figarella et al. | 235/462 |
| 5,401,949 | 3/1995 | Ziemacki | 235/462 |
| 5,418,357 | 5/1995 | Inoue et al. | 235/462 |
| 5,418,862 | 5/1995 | Zheng et al. | 235/462 |
| 5,442,164 | 8/1995 | Adachi | 235/462 |
| 5,444,231 | 8/1995 | Shellhammer et al. | 235/462 |
| 5,446,271 | 8/1995 | Cherry et al. | 235/462 |
| 5,457,308 | 10/1995 | Spitz et al. | 235/462 |
| 5,466,921 | 11/1995 | Lapinski et al. | 235/462 |
| 5,477,042 | 12/1995 | Wang | 235/462 |
| 5,478,999 | 12/1995 | Figarella et al. | 235/462 |
| 5,481,101 | 1/1996 | Yoshida | 235/472 |
| 5,495,097 | 2/1996 | Katz et al. | 235/462 |

OTHER PUBLICATIONS

"Uniform Symbology Specification Code One", AIM USA Technology Group, publication No. TSC059.
"Digital Image Processing", R.C. Gonzalez et al., Addison-Wesley Publication Co., pp. 77–78.

*Primary Examiner*—Donald T. Hajec
*Assistant Examiner*—Thien Minh Le
*Attorney, Agent, or Firm*—Wall Marjama & Bilinski

[57] ABSTRACT

A method and apparatus for capturing and storing a decodable representation of a 1D or 2D bar code symbol using a hand-held bar code reader having only a 1D image sensor. A succession of 1D digital representations are produced as the reader is moved asynchronously across the symbol to be read. These representations are examined, substantially in real time, and, if the symbol is a 1D symbol, is decoded immediately. If the symbol is not a 1D symbol, these representations are examined for the presence of one of a variety of different types of 2D finder patterns and, when the finder has been identified, decoded with reference to that finder pattern.

23 Claims, 8 Drawing Sheets

METHOD AND APPARATUS FOR CAPTURING A DECODABLE REPRESENTATION OF A 2D BAR CODE SYMBOL USING A HAND-HELD READER HAVING A 1D IMAGE SENSOR

FIELD OF THE INVENTION

This present invention relates to bar code readers, and is directed more particularly to a method and apparatus for asynchronously acquiring and storing decodable representations of 1D or 2D bar code symbols using a hand-held reader which includes only a 1D image sensor.

BACKGROUND OF THE INVENTION

One dimensional optical bar code readers are well known in the art. Examples of such readers include readers of the SCANTEAM® 3000 Series produced by Welch Allyn, Inc. Such readers include microcomputers that are capable of reading one dimensional (1D) linear bar code symbols such as the UPC/EAN code, code 39 etc. that are widely used in supermarkets. Such 1D linear symbologies are characterized by having information encoded along one axis only, in the widths of bars and spaces, so that such symbols can be read from a single scan along that axis provided that the scan data are measured with a sufficiently high resolution.

In order to allow the encoding of larger amounts of data in a single bar code symbol, a number of 1D stacked bar code symbologies have been developed, including Code 49 as described in U.S. Pat. No. 4,794,239 (Allais) and PDF417 as described in U.S. Pat. No. 5,304,786 (Pavlidis, et al.). Stacked symbols partition the encoded data into multiple rows, each a 1D bar code pattern on its own, which must all or nearly all be scanned and decoded, then linked to reconstruct the entire message. Scanning still requires relatively high resolution in one dimension only, but multiple scans are needed to read the whole symbol.

A third class of bar code symbologies, called two dimensional (2D) matrix symbologies, have been developed which offer orientation-free scanning and possibly greater data densities and capacity than their 1D counterparts. 2D matrix codes encode data as dark or light cells within a regular polygonal matrix, accompanied by graphical finder, orientation, and reference structures. They generally require for decoding a stored 2D image of the target region, that is, an image in which both horizontal and vertical relationships are recorded with about equal resolution.

In "over the belt" (conveyor-based) readers, such as that described in U.S. Pat. No. 4,634,850 (Pierce et al), a 1D image sensor is used with precise information as to the motion of the conveyor or article to capture a 2D image of the moving symbol from a succession of 1D slices thereof. Known hand-held 2D image capture devices, require either a 2D image sensor which images the entire symbol at one time, or a 1D image sensor which images the symbol one slice at a time, but which requires wheels and/or belts for motion synchronization. Because 1D image capture devices of this type require a smooth flat symbol-bearing surface, they do not offer a widely usable solution to the problem of reliably and efficiently acquiring and storing a decodable 2D bar code symbol. 2D image capture devices, on the other hand, are relatively expensive.

Thus, a need exists for a simple and inexpensive hand-held bar code reader which can read both 1D and 2D bar code symbols, and which can be used without synchronizing elements or signals.

SUMMARY OF THE INVENTION

In accordance with the present invention there is provided an improved bar code reader which uses a 1D image sensor and yet which is able to read both 1D and 2D bar code symbols. This bar code reader is specially adapted to practice a novel method for one dimensionally and asynchronously imaging a bar code symbol, and acquiring and storing a digital representation of one or more imaged slices thereof. In the case of 1D linear symbols or 1D stacked symbols, these one or more digital representations preferably comprise "timercount" representations of the imaged slices, i.e., representations which record the occurrence times of the transitions occurring within the slices. These slices preferably extend across all of the code bars of each row of the symbol and have a resolution which is sufficient to permit the information encoded in the symbol to be accurately decoded.

In the case of 2D matrix symbols, these digital representations comprise "bit image" or "bit mapped" representations of the imaged slices, i.e., representations which record the locations of each data element or bit of the imaged slice. When a plurality of successive bit image representations (hereafter often abbreviated to "bit representations") are considered together, they together comprise a stored representation in which the bits making up the symbol are stored or mapped in memory space in a way that is closely related to the way in which the bits making up the symbol are positioned in the physical space of the printed symbol. Because of this close relationship, the bit representation, once acquired and stored, can be used and decoded in much the same way as a 2D image which has been acquired and stored by a 2D bar code reader, once its finder pattern has been identified and located.

Significantly, the reader of the invention may be used with both 1D and 2D bar code symbols, provided that it is equipped with software that enables it to distinguish between the various types of bar code symbologies that may be used. In the case of distinguishing between 1D and 2D symbols, this comprises software which enables the reader to distinguish between 1D bar code symbols and 2D bar code symbols and, if it is a 1D symbol, to decode the symbol using one or more timercount representations thereof. In the case of distinguishing between the various kinds of 2D symbols, this comprises software which enables the reader to successively test for the presence of the finder patterns that are characteristic of the different 2D bar code symbologies and, when the finder pattern has been identified, to decode the symbol using the stored bit representations thereof. The accomplishment of these two results is facilitated by the fact that the reader of the invention generates both timercount and bit representations of the symbol substantially simultaneously and in real time.

As will be explained more fully presently, one important advantage of the present invention is its ability to determine, solely from information contained in a succession of imaged slices or scans, when to stop acquiring data from the 2D symbol. The present invention accomplishes this by examining the bit representations of successive imaged slices, substantially in real time, for indications of the presence of the types of finders that are used with 2D bar code symbologies. Among these finders are "peripheral" type finders, such as those used with the DataMatrix symbology, "waistband" type finders such as those used with the Code One symbology, and "central" or "bullseye" type finders, such as those used by the Maxicode and Aztec symbologies. The last mentioned symbology is described in copending U.S. patent application Ser. No. 08/441,446, filed May 15, 1995, entitled "Two Dimensional Data Encoding Structure and Symbology For Use With Optical Readers".

With "bullseye" type symbologies, the presence of the central finder is indicated by the emergence of easily recognized numerical patterns that are derived from the abovementioned succession of bit representations using a new finder identifying algorithm to be described hereinafter. With the "peripheral" and "waistband" type finders, the finders may be identified by means of the known finder identifying algorithms for the DataMatrix and Code One symbologies. If symbols with more than one type of finder are being autodiscriminated, these finder identifying algorithms may be applied alternatively and successively, i.e., as candidate algorithms, until one actually succeeds, and makes decoding possible.

In the preferred embodiment of the method of the invention, advantage is taken of the fact that many 1D bar code readers already include programmed control circuitry which operates in conjunction with a fixed frequency timing signal to convert the video signal for a 1D slice of the symbol into a "timercount" representation thereof. These timercount representations of the symbol are produced for each successive slice of the symbol, substantially in real time, as the reader is moved manually across the symbol. As this occurs these timercount representations are stored in successive locations of a timercount memory space. At approximately the same time, these timercount representations are converted to the corresponding bit representations, using a simple well-known conversion algorithm and then stored in an image memory space. In this way, the method of the invention takes the fullest possible advantage of existing capabilities of existing 1D bar code readers to enable the reader to distinguish between and then decode both 1D and 2D symbols. It will be understood, however, that, if taking advantage of existing bar code reader capabilities is not important, the reader may be designed so that the timercount and bit image signals are generated simultaneously and independently.

In the event that it is known that the reader will be used to read only 2D bar code symbols, the inclusion in the method (or apparatus) of the invention of steps (or circuitry) that are used to identify and process 1D bar code symbols is unnecessary. It will therefore be understood that, in embodiments of the latter type, the generation of timercount representations becomes optional, being included or not included depending upon whether or not it is useful in generating the bit representations used with 2D bar code symbols. In embodiments of the latter type, there may also be eliminated those steps or program segments that are directed only to the identification and processing of 1D bar code symbols.

In accordance with a secondary feature of the invention, digital representations are stored in both of the abovementioned memories, substantially in real time, on a first in-first out basis, with representations of old slices being shifted through the memory (or at least with respect to an address pointer) as representations of new slices are stored. On reaching the end of the memory space, representations of old slices are re-entered at the beginning of the memory space. As a result, the two memory spaces contain two circulating representations of the symbol being read, one a timercount representation and one a bit representation. Sets of newly received timercount representations are examined as they occur and, if they indicate the presence of a 1D symbol, are decoded at once. If this decoding does not succeed, indicating that a 2D symbol may be present, the bit representations are examined to determine if a finder can be identified and located. Once the finder is identified and located, the portion of the symbol that is then being imaged is known. The finding of this finder may then be used to continue the imaging of the symbol until there are enough stored representations of the symbol to allow the latter to be decoded.

Thereafter, optionally, the bit representations may be reorganized (e.g. rewritten in a different order or re-addressed) so that both the individual data bits and the finder pattern are located in their true relative positions with respect to one another. If the image memory space is too small for this to be done within the image memory, the reorganization may take place in the course of transferring the bit representation from the image memory to the timercount memory. In either case, the resulting bit image will be in condition for decoding using the decoding algorithm that is associated with the symbology indicated by the type of finder that has been found.

In its apparatus aspect the present invention contemplates a 1D bar code reader which is in many respects similar to existing 1D bar code readers, except that its timing, memory structure and programming has been altered in a way that allows it to be used in accordance with the abovesummarized method. More particularly, the apparatus of the invention may comprise a 1D bar code reader which has been modified to increase its clock rate by an amount sufficient to enable it to be used to image many successive slices of the symbol as it is moved thereacross. In addition, the memory structure of the reader is modified to make the abovementioned memory spaces available for use in storing and shifting the timercount and bit representations which are associated with these slices. Finally, the programming of the reader is modified to coordinate the generation and storage of the latter representations, to differentiate between 1D and 2D bar code symbologies and, if a 2D symbology is used, to identify the symbology on the basis of the type of finder that is used, and then discontinue the imaging of the symbol after there has been stored a number of digital representations which is sufficient for decoding purposes. (It should be noted in the last mentioned connection that, because error correction data is encoded in 2D bar code symbols along with message data, it is often possible to fully decode a message even though a part of the symbol is missing.) Because the functions of these modifications have already been discussed in connection with the foregoing summary of the method of the invention, they will not be repeated here.

Other objects and advantages of the present invention will be apparent from the following description and drawings.

DESCRIPTION OF THE DRAWINGS

FIGS. 5-1, 5-2 and 5-3 show the contents of the image memory at various stages in the scanning of the symbol of FIG. 5;

DESCRIPTION OF THE EMBODIMENTS

Figure 1:
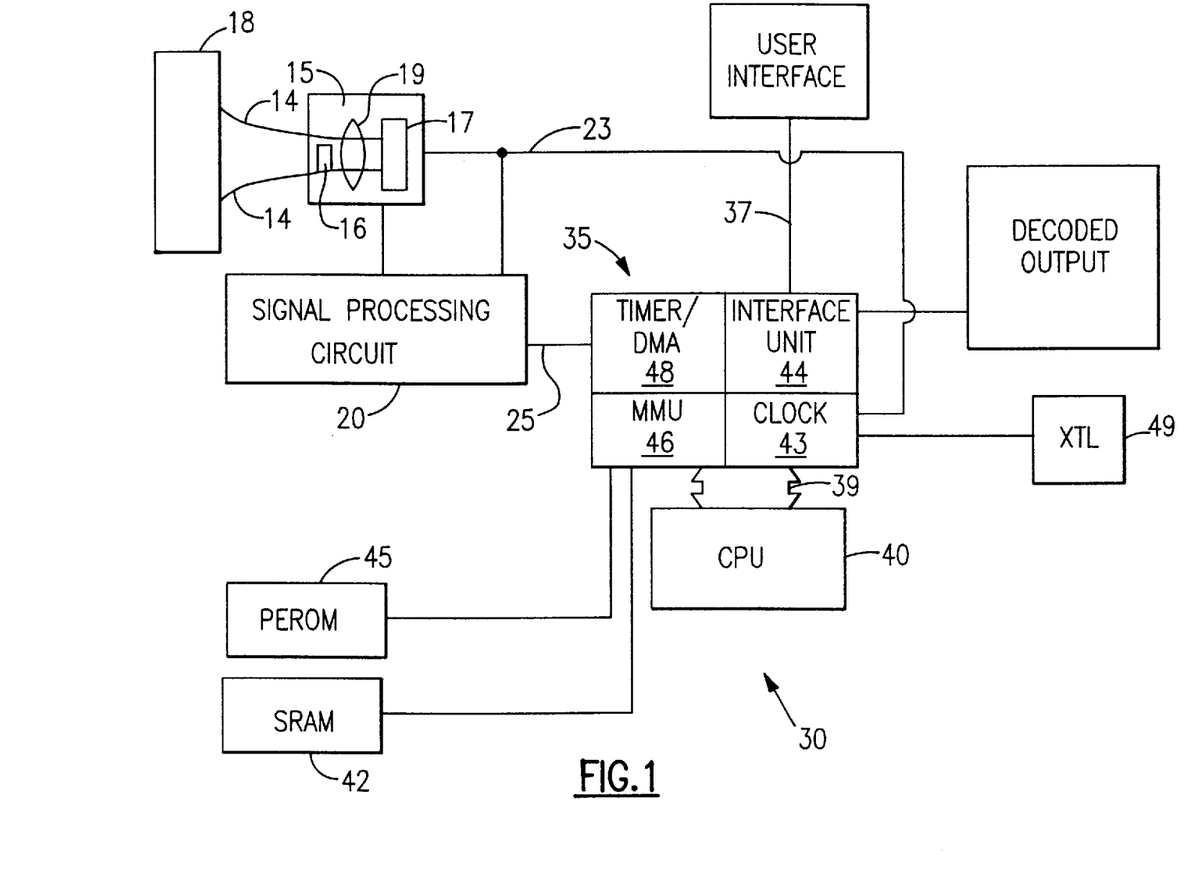
FIG. 1 is a block diagram of a bar code reader suitable for use in practicing the present invention.

Referring to FIG. 1 there is shown a block diagram of a bar code reader of a type which is suitable for use in practicing the present invention. This bar code reader may be a 1D bar code reader of the type sold by Welch Allyn, Inc., Skaneateles, N.Y. under the model designation ST-3000-22, provided that certain modifications to be discussed later are made thereto.

The bar code reader includes an illumination system which may comprise a plurality of 660 nm light emitting diodes 16 that illuminate a narrow strip or slice of a bar code symbol 18. Reader 10 also includes focusing optics 19 which may be of the type described in U.S. Pat. No. 5,291,008, which is assigned to the assignee of the present invention, and incorporated herein by reference. Focusing optics 19 causes light returning from the bar code symbol along a receive path 14 to be focused or imaged upon a 1D image sensor 17 which may be of the charge coupled type. Sensor 17 develops analog signals that represent the optically readable content of a complete slice of the bar code symbol. These analog signals are supplied to signal processing circuit 20, which provides signal conditioning and digitization, using a high frequency timing signal or clock received over a clock input line 23. Digitization is accomplished using an analog reconstruction circuit which is disclosed in U.S. Pat. No. 5,294,783, of common assignee herewith, and also incorporated herein by reference. The resulting video signal representation of the imaged slice is supplied via an output line 25 to programmed control circuitry 30 of FIG. 1.

Programmed control circuit 30 performs various tasks necessary to the operation of the reader. It includes a central processing unit 40 which may comprise a Motorola MC68HC11 microcontroller/microprocessor and has an address space of 64 Kbytes. This microprocessor includes serial and parallel I/O, interrupt logic, an oscillator, and clock logic. Microprocessor 40 is also provided access to an 8 Kbyte static random access memory (SRAM) 42 and a 32 Kbyte read only program memory (PEROM) 45. The capabilities of microprocessor 40 are enhanced by a multifunctional application specific integrated circuit (ASIC) 35 which may be of the type sold under the product designation 21203276-01 by Welch Allyn, Inc. As shown in FIG. 1 ASIC 35 has four principal functional subunits or blocks. A clock control subunit 43 facilitates switching the scan rate of image sensor 17 between 50, 100, and 200 scans/second, although only the latter is used with the present invention. A memory management subunit 46 (MMU) provides memory management capability. The timer/DMA subunit 48, coupled to signal processing circuit 20, automates the capture of image data for subsequent processing. Finally interface subunit 44 serves as a RS-232 communications interface for bar code reader 10, via line 37. ASIC 35 and its subunits allow microprocessor 40 to concentrate its resources on decoding data read from the bar code symbol. ASIC 35 as a whole is controlled by microprocessor 40 through a suitable bus 39.

The timing of the circuitry of FIG. 1 is controlled by ASIC 35 based on a timing signal received from a crystal 49. To increase the performance of the reader, and to handle the high image sampling rates necessary to read two dimensional bar code symbols, a crystal having a frequency of 14.7456 MHz, has been substituted for the 7.3728 MHz crystal which is included in the unmodified Model ST3000-22 bar code reader. Other modifications to the basic Model ST3000-22 include the use of the following:

SRAM 42—a 70ns, 8K×8 CMOS RAM sold by Sony Corp. under the product designation CXK5864BM-70L.

PEROM 45—a 90ns ROM sold by ATMEL under the product designation AT29C256-9.

Regarding the above mentioned modifications, the use of a higher timing signal frequency is the most important to the present invention and the remaining modifications are made to assure reliable operation of the circuitry at this higher frequency.

Figure 2:
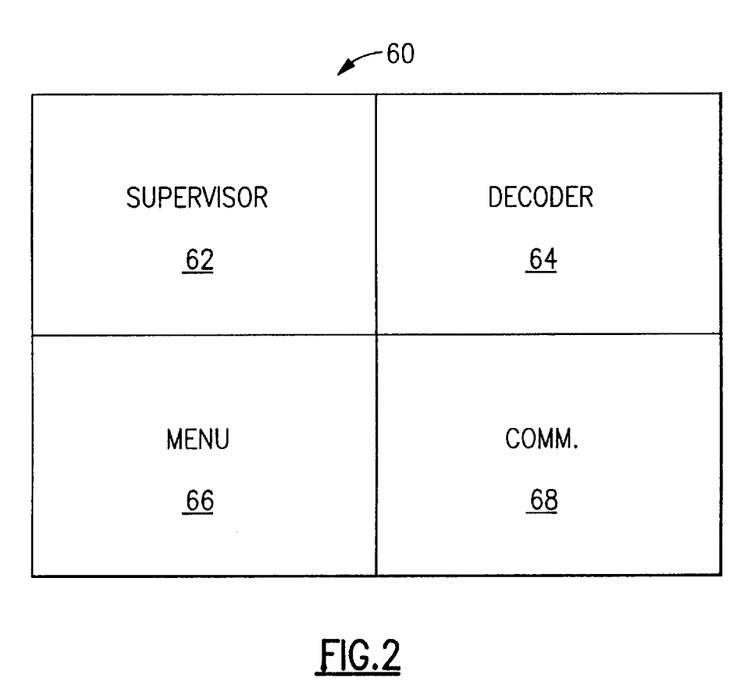
FIG. 2 shows an exemplary architecture for the PEROM program block shown in FIG. 1.

Firmware resident in the PEROM 45 contains the stored program for microprocessor 40. Portions of the program realized in the PEROM 45 are conventional, and allow the bar code reader 10 to function as a conventional autodiscriminating reader for linear bar code symbologies. Broadly speaking, firmware 60 includes 4 main program segments as shown in FIG. 2. A variety of system supervisory functions, indicated by reference numeral 62 include the initialization of volatile hardware and memory regions, controlling and sequencing the scanning and decoding operations, and monitoring and maintaining I/O between the bar code reader, the operator, and external equipment.

Decoding functions, indicated by reference numeral 64, are accomplished in several stages. First a preliminary examination for the presence of a 1D bar code symbol is performed. If a 1D linear symbol is found, an attempt is made to decode the symbol with reference to the timercount representations of the slices until decoding is successful, one timercount representation of the symbol often being sufficient for this purpose. If further representations indicate that a stacked 1D stacked symbol is found, this procedure is repeated until all rows of the symbol have been successfully decoded. If it is determined that the symbol is a 2D symbol, the symbol is examined with reference to successive bit representations of the imaged slices, which are stored in SRAM 42 substantially in real time. As this is occurring the representations are examined to identify the type and location of the finder pattern therefor. The identification is facilitated by the fact that the simultaneous availability of a number of bit representations allows the recognition of data structures such as finders which cannot be recognized and identified from a single bit representation. Once the latter have been determined, additional bit representations are stored until there have been stored a number of such representations which is sufficient to make possible the decoding of the symbol. The stored 2D image may then be decoded using a decoding algorithm of a type appropriate to the symbology used to encode the symbol.

In operation, a user will normally depress a trigger (or set the unit to automatic scan mode) and sweep the scanner over the image one or more times until the audio alert (e.g., a "beep") is heard and the decoded information is output. Alternatively, the user might manually specify whether 1D and 2D codes are to be read, or this could be determined automatically by the reader.

The menu functions, indicated by reference numeral 66, are routines called in response to decoding special bar code symbols, so-called bar code "menus" that set non-volatile bits or values within a designated configuration region of the PEROM 45, thus governing various operating characteristics of the bar code reader 10, such as scan rate, beeper volume, mode of operation (manual or auto-trigger), enablement of decoding of particular bar code symbologies, etc.

Communications functions 68 service the hardware and include protocols needed to deliver scanned data to an attached device. The bar code reader 10 can support a number of communications protocols and interfaces, including laser output, OCIA, OCR, RS-232, various commercial terminals and keyboard wedges.

Except for the above-discussed modifications to the circuitry and programming of the reader, reader 10 is of a type that is commercially available to and understood by those skilled in the art. Accordingly, the circuitry shown in FIGS. 1 and 2 will not be further described herein.

Figure 3:
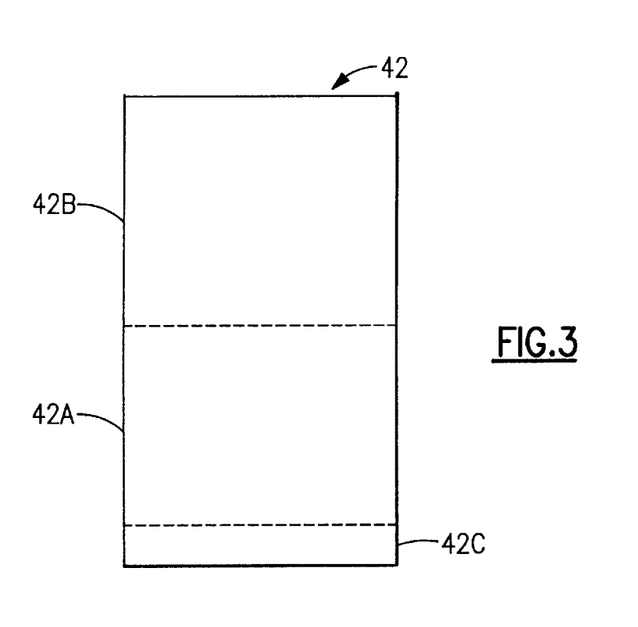
FIG. 3 shows an exemplary architecture for the SRAM block of FIG. 1.

Referring to FIG. 3 there is shown an enlarged view of SRAM 42 which illustrates how the latter is organized for use in practicing the present invention. In the embodiment of FIG. 3 the 8 kilobytes of memory which are included within SRAM 42 are grouped into a first or image memory space 42A which includes approximately 3.7 kilobytes, a second or timercount memory space 42B which includes 4 kilobytes, and a third or accessory memory space 42C which includes approximately 0.3 kilobytes, and which may be used as a "connectivity" register in the course of identifying the finder pattern of the symbol, and as a set of general purpose registers for conventional microprocessor housekeeping functions. It will be understood that these numbers are exemplary only and that these memory spaces may be located either on the same chip or on separate chips.

In the preferred embodiment, second memory space 42B is used on a first in-first out basis to receive and store successive timercount representations of the slices of the bar code symbol which are imaged as reader 10 is manually moved across a bar code symbol. In the case of 2D symbols, this movement may be asynchronous and may be in any direction, provided that enough of the symbol can be imaged along that direction to make decoding possible. In the case of 1D symbols, this movement may also be asynchronous, but must be within a range of directions that allows each code bar of the symbol to be included within the timercount representation. The numbers which are included in each timercount representation comprise the number of timing pulses which have occurred at the times when the video signal from signal processing circuit 20 undergoes transitions from 1's to 0's or vice-versa. An illustration of how the data from a video signal for an imaged slice is converted to a timercount representation thereof, and then stored in timercount memory 42B is shown in FIG. 6.

Similarly, first or image memory space 42A is used on a first in-first out basis to receive and store successive bit representations of the slices of the bar code symbol which are imaged as reader 10 is manually moved across a bar code symbol. These bit representations contain substantially the same information as the timercount representations thereof, although in a different format, the conversion of one format to the other being possible with the use of known conversion algorithms. In the preferred embodiment of the invention, the bit representation of each slice is derived from the corresponding timercount representation thereof by the use of such an algorithm, as suggested by FIG. 6. This conversion is performed because it makes possible the use of the timercount generating circuitry and programming of existing 1D readers with a minimum of modification. More generally, however, the bit representation of each imaged slice of the bar code symbol may be derived directly from the video signal, if desired. A series of examples of how the bit representations of successive slices are "shifted" through image memory 42A during the movement of the reader across a bar code symbol is shown in FIGS. 5-1 through 5-3.

Figure 4:
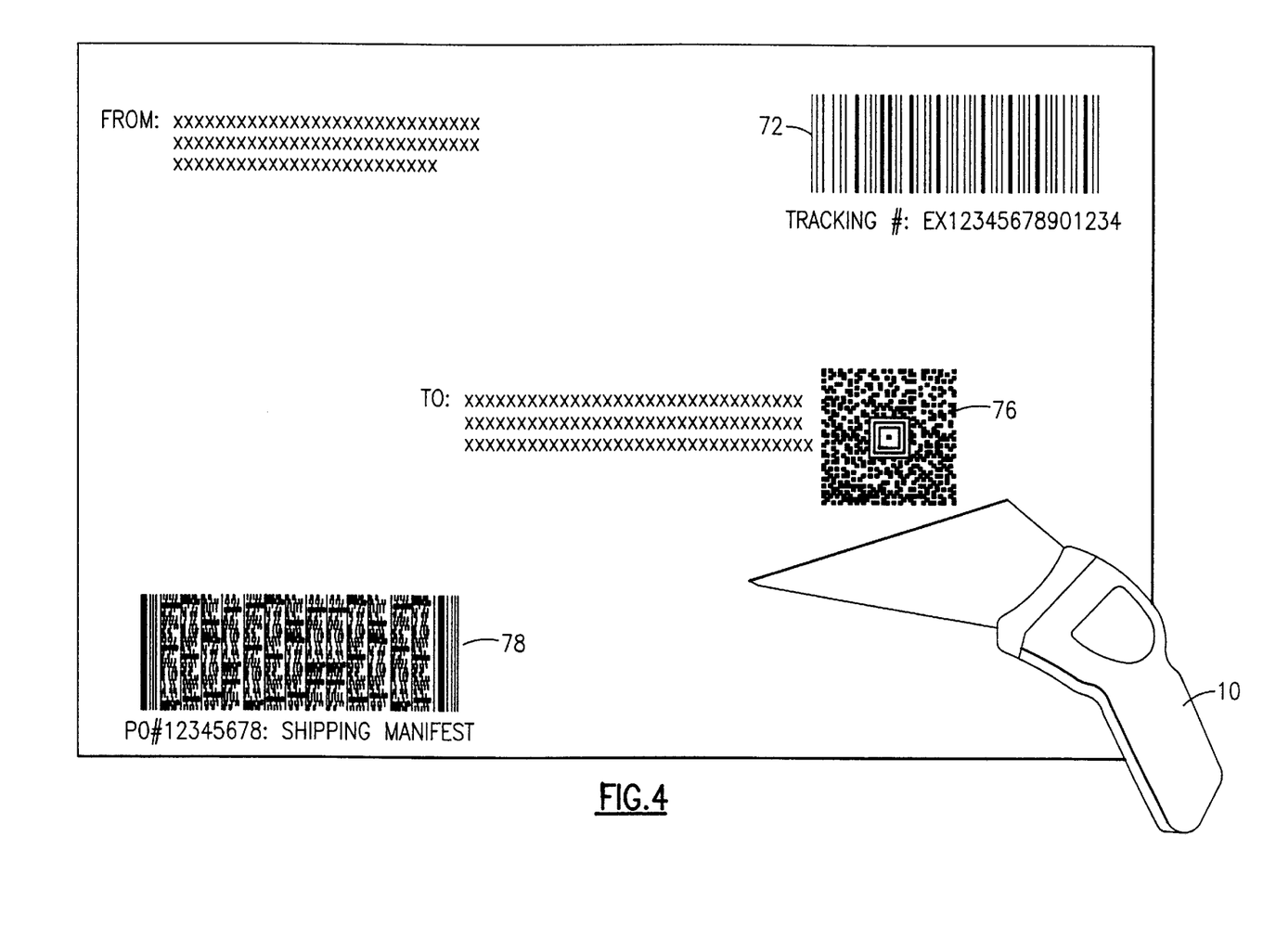
FIG. 4 shows a bar code reader with a shipping carton which bears both 1D and 2D bar code symbols.

FIG. 4 shows the bar code reader of the invention together with a package marked with examples of the types of bar code symbols which it is able to read. Included among these examples are a 1D linear bar code symbol 72, a 1D stacked symbol 78, and a 2D bar code symbol 76. All of the illustrated symbols could, in principle, be read omnidirectionally, i.e., in any direction, by the scanner if there were no resolution, memory or processing limitations in the bar code scanner. In the case of 2D bar code symbols, this omnidirectional reading can be easily achieved because readers designed for use with such symbols require a relatively low resolution along its two mutually perpendicular axes. In the case of 1D bar code symbols, high resolution along only the horizontal axis of the symbol is important because information is encoded in the edge positions of the code bars of the symbol. This, together with the need to image all code bars in each imaged slice, place practical limits on the range of directions along which 1D symbols can be read. Thus, while the invention can read both 1D and 2D symbols, it is, for practical reasons, fully omnidirectional only for 2D symbols.

Figure 5:
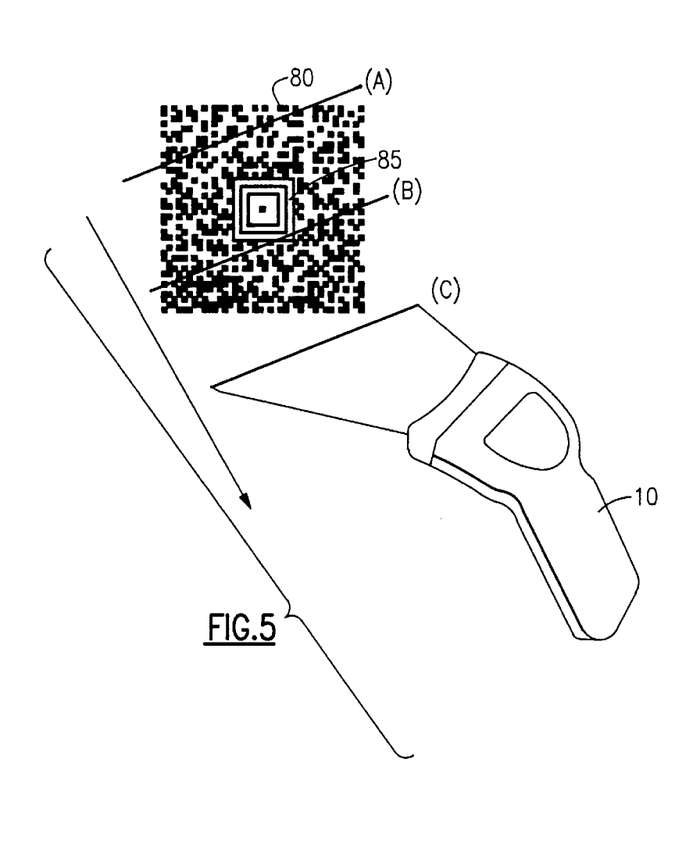
FIG. 5 shows the bar code reader of the invention being moved across a 2D bar code symbol.
Figure 6:
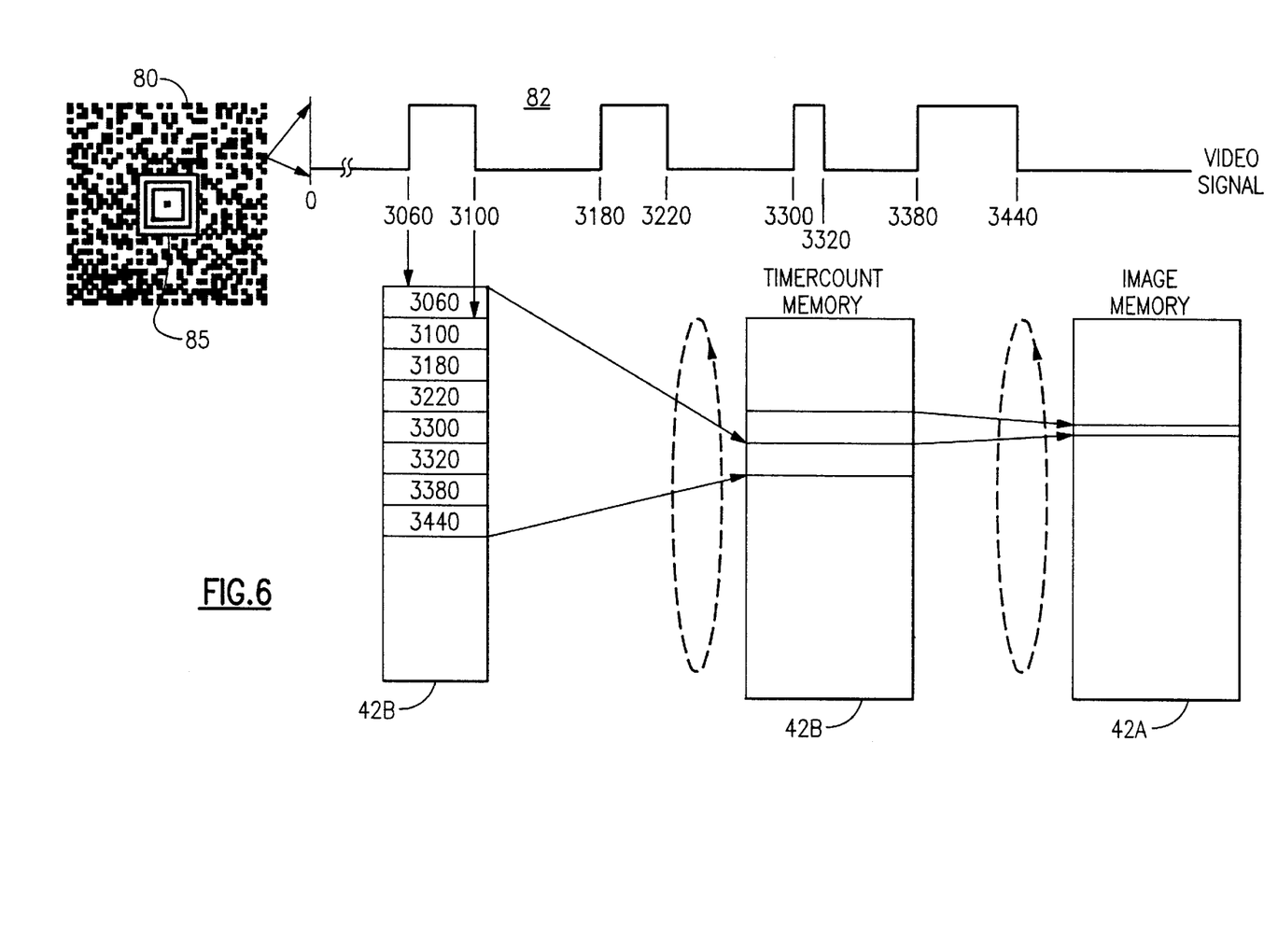
FIG. 6 shows the relationship between the various representations of data read from a slice of a bar code symbol.

FIGS. 5, 5-1, 5-2, 5-3 and 6 illustrate how a 2D bar code symbol which uses the above mentioned Aztec symbology is read in accordance with the method and apparatus of the invention. Line segments (A), (B), (C) of FIG. 5 represent various 1D slices imaged by the reader as it is swept across 2D bar code symbol 80. As shown in FIG. 6 each imaged slice produces a video signal 82. Timercounts representing the occurrence times of transitions between black to white and white to black image elements are measured and stored sequentially in respective locations within memory 42B, which serves as a timercount memory. As the timercount representation of each slice is stored in timercount memory 42B, the timercount data for the preceding slice is converted into the bit representation of that slice and stored in a respective location in memory 42A, which serves as an image memory.

In the preferred embodiment of the present invention, which is based on a modified 1D reader, the above-described conversion of the timercount representation to the corresponding bit representation is performed by microprocessor 40, while the storing of the timercount and bit representations is handled by the timer and DMA subunit of ASIC 35. With a total of only 8 Kilobytes of storage space in SRAM 42, the amount of memory space that is available for storing the bit image is limited to about 3.7 K. As a result, the bit image produced by the embodiment of FIG. 1 has a relatively low resolution, namely: 170 lines of 176 bits each. This resolution may, however, be increased as necessary by increasing the storage capacity of SRAM 42, and/or the number of light responsive elements in 1D sensor 17, and/or the frequency with which the video signal is examined for the occurrence of transitions.

Bit representations 81, 82, and 83 of FIGS. 5-1, 5-2 and 5-3 represent the contents of image memory 42A after the reader has imaged symbol slices A, B, and C, respectively of symbol 80. As can be seen, when image memory 42A is filled through the end thereof an input pointer P jumps back to the beginning of the memory space, so that slices of the bit image are effectively shifted or circulated through the image memory. A similar circulation occurs for the timercount representations stored in timercount memory 42B. The circulation of these representations is shown in FIG. 6 as closed loops shown in dotted lines.

As the bit representations of symbol 80 are imaged and stored, they are analyzed (as will be described below) to see if the finder pattern has been located. If the 2D symbol uses the Aztec symbology, this finder pattern will include the set of nested or concentric black and white squares labelled 85 in FIGS. 5 and 6. FIGS. 5-2 and 5-3 show symbol images 82 and 83 which include this finder pattern. Once this finder pattern is found, data from a predetermined number of additional slices of the symbol are processed and input into timercount memory 42B and image memory 42A in order to assure that enough of the image of the symbol is stored to allow the latter to be decoded. Since the position of the resulting image with respect to the boundaries of the memory space (or address pointer P) cannot be predicted in advance, the image may be stored in two parts as shown for bit image 83 in FIG. 5-3. If desired, in order to facilitate decoding, these two parts may be joined together into a single image by reorganizing (as by reordering) the bit representations stored in the image memory. The purpose of this reorganization is to assure the formation of a substantially complete, decodable image of the bar code symbol as a whole, i.e., an image in which the bits of the bit image representations are located (in memory space) in their true relative positions with respect to the finder. Thus, bits which are adjacent to one another in the physical space containing the printed symbol will be adjacent to one another in the memory space containing the stored image thereof.

If image memory space 42A is too small for the above-described reorganization, a similar result may be achieved by transferring the image to the timercount memory as a complete unit with all parts of the image including the finder located on the same side of the pointer of the timercount memory. While such a transfer involves the overwriting of data previously stored in the timercount memory, such overwriting is not a problem since the data stored in the timercount memory is then no longer needed.

It will be understood that the above-described reorganization of the captured image of a bar code symbol is a desirable but not essential part of the present invention. This is because a reorganization of this type is necessary or desirable with some decoding algorithms, but unimportant with others. Whether or not such a reorganization is necessary or even beneficial is also dependent upon the type of finder pattern that is used in the bar code symbol. Thus, the present invention contemplates a reorganization of the captured image of the symbol in those cases where such a reorganization is necessary or beneficial to decoding, but no reorganization in those cases where it is not necessary or beneficial.

As will be explained more fully presently, the above-described image capture process takes place within the framework of an image analysis or typing process that involves a series of attempts to decode the unknown symbol as a 1D linear or 1D stacked symbol and, if it cannot do so, a series of attempts to identify a 2D finder and then decode the symbol using the identified finder. The image analysis process as a whole is best visualized with reference to the flow chart of FIG. 7. The 1D part of this analysis is best visualized with reference to the flow chart of FIG. 8. The 2D part of the analysis is best visualized with reference to the flow chart of FIG. 9. For the sake of clarity and "connectedness", the flow charts of both FIGS. 8 and 9 include (above their respective dotted lines) the part of the flow chart of FIG. 7 that leads into them.

The above-summarized image analysis framework will now be described with reference to FIGS. 7–9. Turning first to the flow chart of FIG. 7, the image analysis begins with block 102 which calls for the reader to wait for a trigger press. When this trigger press does occur, the reader enables its scanning and timing mechanisms as called for by block 104 to initiate the imaging of stored slices. The reader then tests to see if the trigger is still depressed (block 106). If the trigger is not still depressed, the reader knows that the read is being terminated and directs the disabling of the scanning and timing mechanisms (block 120) before returning to its wait condition (block 102). If the trigger is still depressed, the reader waits for the completion of the next scan slice (block 108) and then begins the image analysis proper by proceeding to block 200.

Figure 8:
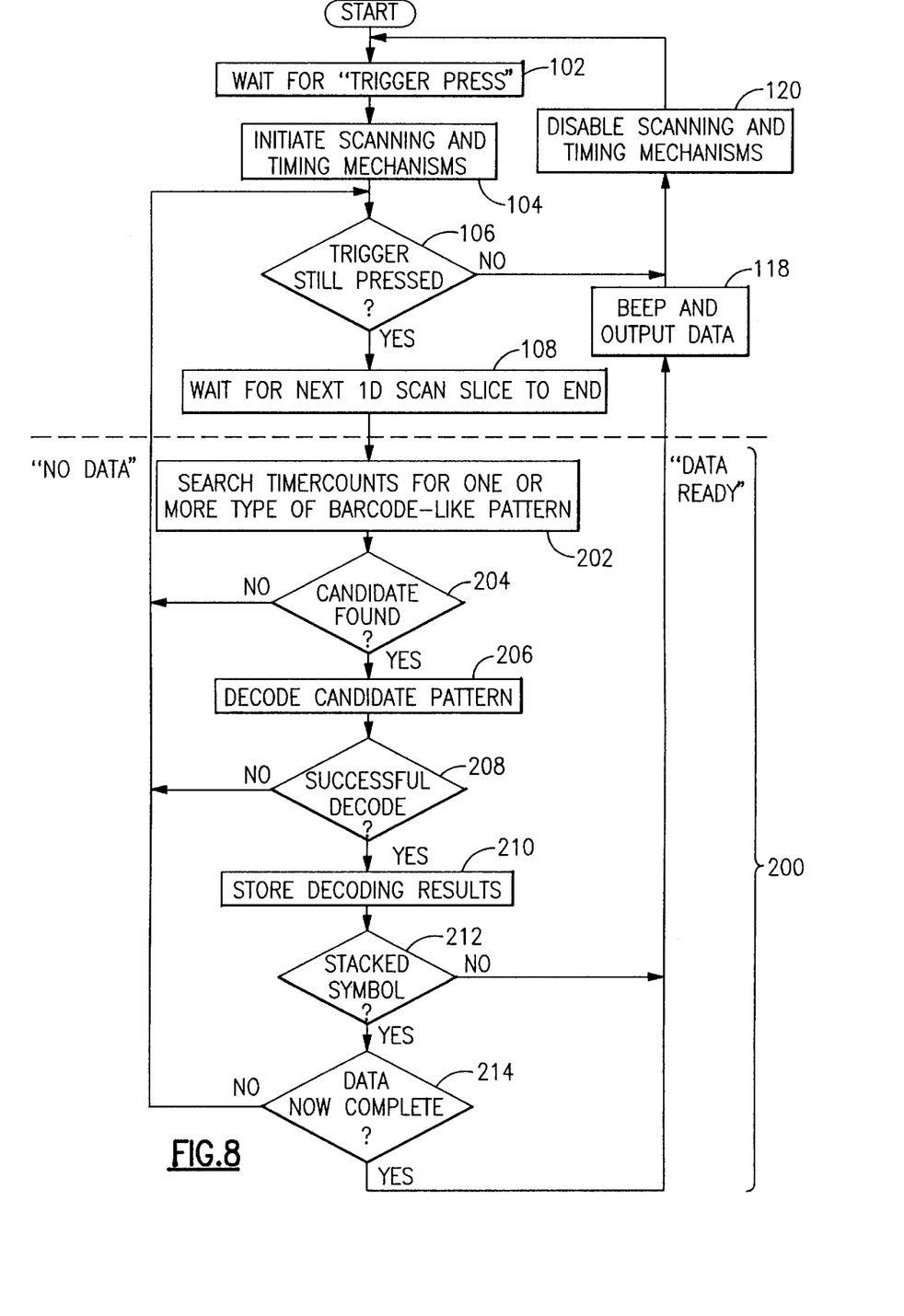

Block 200, which will be described more fully in connection with FIG. 8, represents the steps necessary to decode a 1D symbol of either type, if one is present, and the reader attempts to perform this decoding on encountering this block. The reader continues this attempt until the attempt is successful and a complete message is ready, or until the attempt fails. If the reader determines that the former has occurred (block 112), i.e., "Data Ready", the reader produces a beep and outputs its data, as called for by block 118, before disabling the scanning and timing mechanisms (block 120) and returning to its wait state (block 102).

If the reader cannot decode the symbol or otherwise produce a complete message, block 112 directs the reader to block 300, which represents the steps necessary to decode a 2D symbol of any of a variety of types. This is done because one reason why no data was ready (block 112) may be that the symbol is not a 1D symbol, i.e., is a 2D symbol. Whether or not that is actually the case at that time remains to be determined. This is because the reason why there was no "Data Ready" may be that the symbol was damaged or was a 1D symbol read from an unpermitted direction. Thus, block 300 gives the reader a chance to decode the symbol as a 2D symbol before allowing it to give up and return to its wait state.

Upon completing the steps called for by block 300, the reader determines if a decodable message is ready (block 116) and, if so, outputs its data and returns to its wait state. If a decodable message is not ready, it may be because more of the 2D symbol needs to be imaged before decoding can occur. As a result, the reader is directed back to block 106 to repeat the above-described analysis process for additional scan slices until a complete decoded message is ready and then outputs the message and returns to its wait state.

Figure 7:
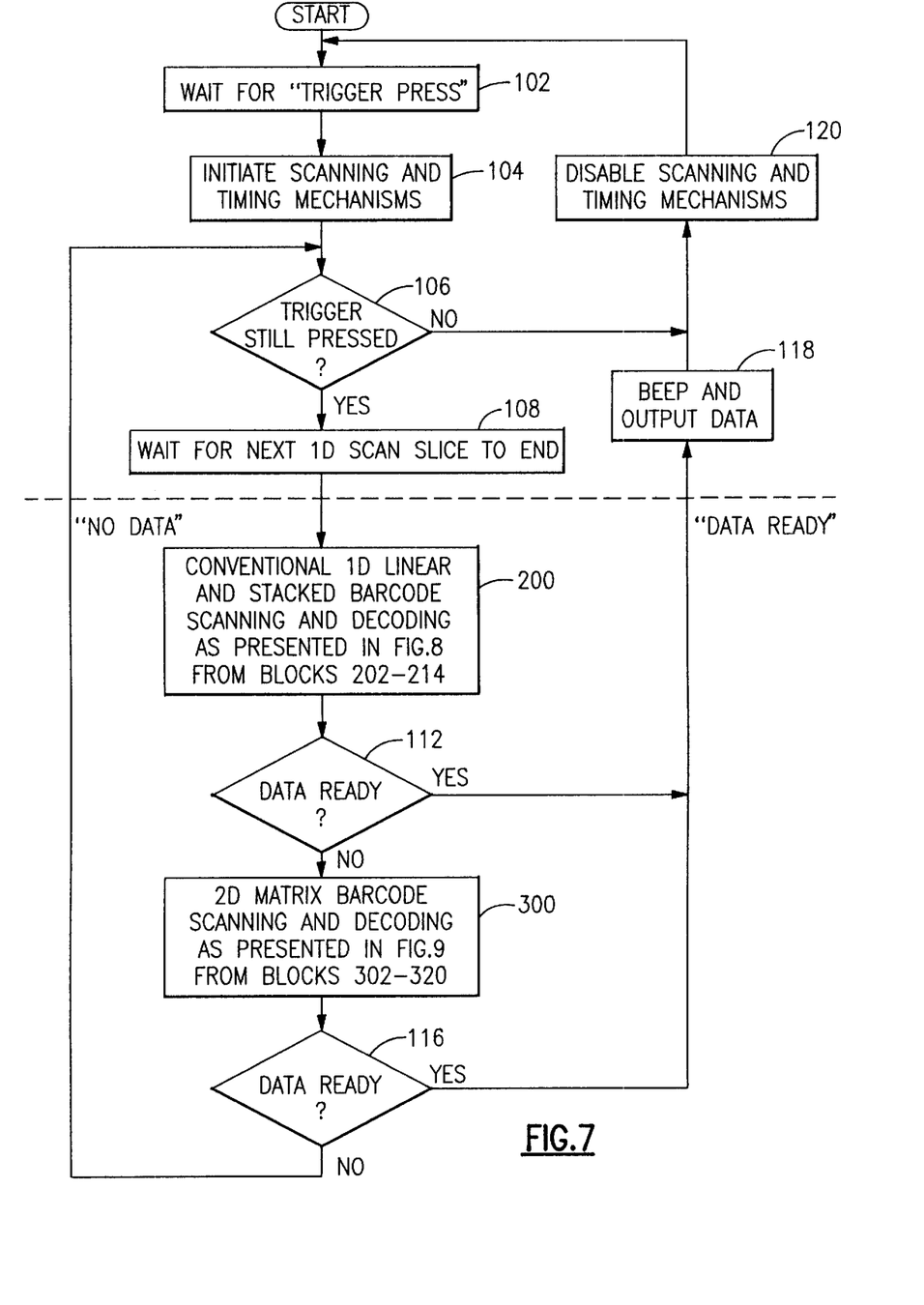
FIGS. 7-9 are flow charts which illustrate the operation of the present invention.

In view of the foregoing, it will be seen that the analysis process shown in the flow chart of FIG. 7 will ultimately output a decodable message from both 1D and 2D symbols provided only that the symbol is readable and is read from a permitted direction. In doing so, the reader, in effect, finally determines which type and subtype of symbol is present by determining which symbol type and subtype resulted in a decodable message.

Referring to FIG. 8, there is shown (below the dotted line) the steps necessary to decode and assemble into a message the data encoded in a 1D linear or 1D stacked symbol, if one is present. These steps employ a process of elimination similar to that discussed in connection with FIG. 7. More particularly, the flow chart determines if a 1D linear or 1D stacked symbol is present by attempting to decode first one and then the other, and deciding if one or the other is present by whether or not the attempted decoding was successful.

Because 1D autodiscriminating algorithms (i.e., algorithms which are capable of differentiating between and then decoding any of a variety of different subtypes of 1D linear symbols) are well known in the art, the steps involved in carrying out the actions called for by blocks 202 through 210 of FIG. 8 will not be discussed in detail herein. Similarly, because an algorithm suitable for use in decoding 1D stacked symbols is taught by the above-cited Allais patent, the steps involved in carrying out the actions called for by blocks 212 and 214 of FIG. 8 will not be described in detail herein.

Figure 9:
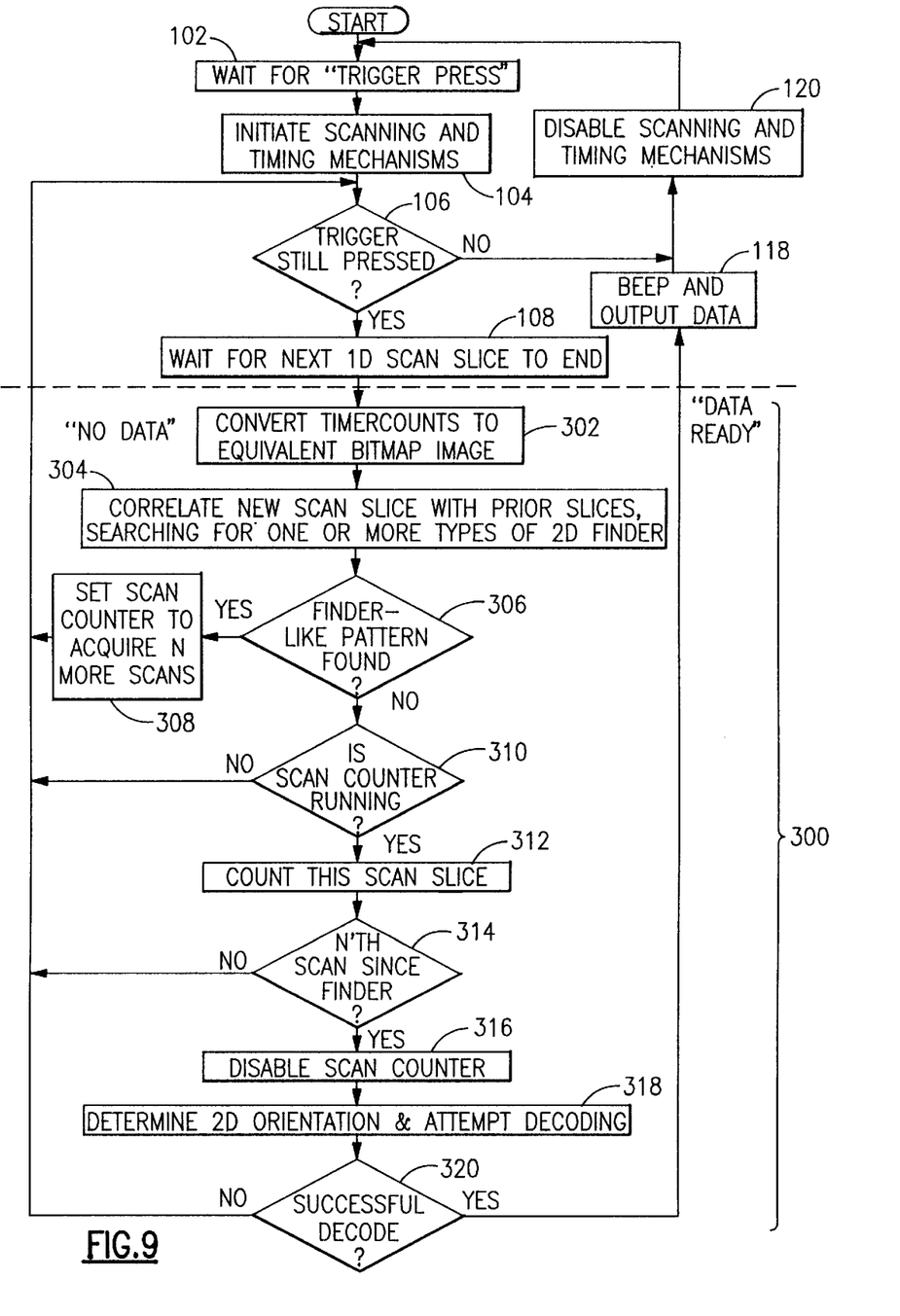
Figure 51:
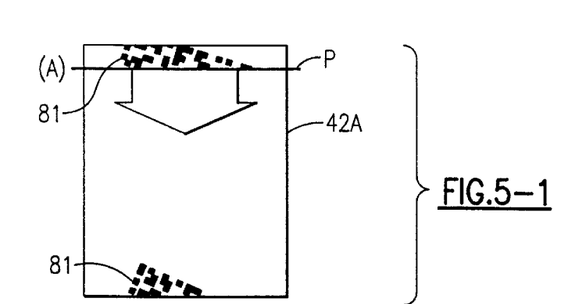
Figure 52:
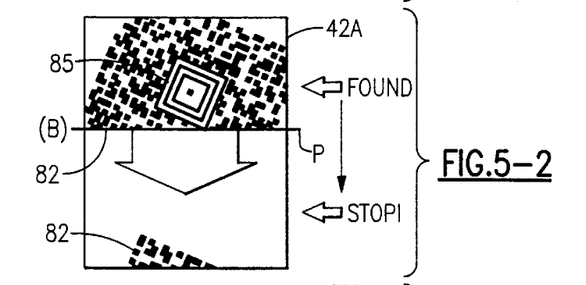
Figure 53:
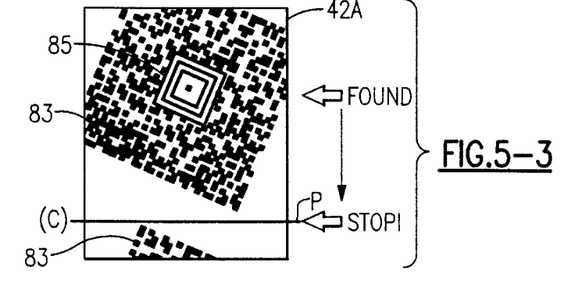

Referring to FIG. 9, there is shown (below the dotted line) the steps involved in decoding and assembling into a message the data encoded in a 2D symbol (if any) having any of a variety of different types of finder patterns, such as central finders, waistband finders and peripheral finders, among others. In doing so, FIG. 9 employs a process of elimination similar to that discussed in connection with FIG. 7. More particularly, after converting the current timercount representation to its corresponding bit representation (block 302), the reader correlates the current bit representation with the bit representations of a number of preceding scan slices to determine if a finderlike pattern is present, as called for by blocks 304 and 306. This may be accomplished by applying a number of candidate finder identifying algorithms, image processing algorithms, or known fuzzy logic pattern recognition techniques, such as those described in U.S. Pat. No. 5,401,949 (Ziemacki). If a finder-like pattern is found, the reader acquires enough additional representations to permit the symbol to be decoded. This is accomplished with the use of a scan counter and associated control blocks 308 through 316. Once this has been done, the reader determines the orientation of the 2D image and attempts to decode it as called for by block 318. If the attempted decode is successful, the reader outputs its data and returns to its wait state (block 320). If it is not successful, the reader is directed back to block 106 to make another try at decoding.

The examination of the sets of bit representations for the type of finder (if any) that is present preferably involves the application of a process of elimination which uses the same algorithms which are used by conventional readers to located their finders. The waistband type finder used with the Code One symbology may, for example, be found using the algorithm described in "Uniform Symbology Specification Code One", published by AIM USA Technology Group, under publication no. TSC 059. Similarly, the peripheral type finder used with the Data Matrix symbology may be found using the algorithm recommended by its originator, and the circular central type finder used by the Maxi Code symbology may be found using the algorithm recommended by its originator. In the case of the Aztec symbology, a particularly advantageous algorithm for finding the finder has been developed which also works well with symbols using other types of central finders such as Maxicode. Because a description of the latter algorithm is not as yet publicly available, a description thereof will now be provided.

With finder patterns of the central type the bits of successive slices are examined to find a small "island" (black region) within a larger "lake" (white region), within an island, within a lake, etc. This is done by determining how isolated each pixel is from the top and sides of an image, by which measure the center of any bull's-eye stands out plainly. An explanation of a quick scanning algorithm for finding such a bull's-eye structure will now be given.

The following algorithm, presented descriptively and in C code to be more easily understood by a computer programmer, locates a point of high "isolation"—e.g., the center of a bull's-eye—in a stored image. First assume that a fully contrasted image of "n" pixels wide of the 2D bar code is stored in the array I[x][y] where 0≦x<n and each element I[x][y] is valued either 0 (for white) or 1 (for black). This can be either a single image frame (0≦y<m) from a 2D sensor or a continuously acquired image (0<=y<??) rolling off a 1D sensor that moves in relation to the target.

A "level" array L[x] "n" values wide is first established, where L is an unsigned integer. L is initialized to the values of the top row in I as follows:

for (x=0; x<n; x++)L[x]=I[x][0];

Subsequent rows of the image are processed in sequence by bi-directional scans through L as follows.
for (y=1; y<m; y++)
{
Working first left-to-right, the left-most L is set equal to the left-most I value in that row, then each subsequent L[x] is set to: (a) the lesser of its current value (from the row above) or its left-hand neighbor, and then (b) plus one if needed to make the new L and its corresponding I both even or odd. This can be represented mathematically in C code as follows.

```
L[0] = I[0][y];
for (x = 1; x < n-1; x++)
{   if (L[x-1] < L[x]) L [x] = L[x-1];
    if ((L[x] ^ I[x][y])%2 = = 1) L[x] = L[x] + 1;
}
```

Working then back right-to-left, the right-most L is set equal to the right-most I, then subsequent L's are reduced by 2 (1 or more times) if they exceed their right-hand neighbor by 2 (1 or more times):

```
L[n-1] = I[n-1][y];
for (x = n-2; x >= 0; x- -)
{   while (L[x] >= L[x+1] + 2) L[x] = L[x] - 2;
}
```

As the process is repeated with data from each subsequent scan, from row to row the L values will start to reflect how isolated any image region is from its top and sides. After processing a row through part of a bull's-eye, the sequence of L values in its vicinity will look something like:
. . . 2223333444555566655544443333222 . . . .

The "finder (or bull's-eye) located" criterion may be characterized as 4 or more consecutive increases in isolation value followed by 4 or more consecutive decreases. The highest values mark the center of the "bull's eye." Scanning through L with a simple state machine (probably as part of the right-to-left scan above but shown here as a separate operation) detects this condition:

```
state = peakx = 0;
for (x = n-1; x ≧ 0; x- -)
{       switch(state) {
        case 0:
        case 1:
        case 2:
        case 3:         if (L[x] < L[x+1]) state = 0;
            if (L[x] > L[x+1]) { peakx = x; state++; } break;
        case 4:         if (L[x] > L[x+1]) peakx = x;
            if (L[x] < L[x +1]) state ++; break;
        case 5:
        case 6:
        case 7:         if (L[x] > L[x+1]) state = 0;
            if (L[x] < L[x+1]) state++; break ;
        default:
        }
}
```

If this scan through L ends with "state"=8, then the point I [peakx][y] is a candidate bullseye center. The true center of the bull's-eye will have the highest level of isolation, so the search will continue for the possibility of a candidate having a higher level of L. If a variable peakl is initialized to zero at the top of the scan, then the candidate bull's-eye center location can be logged by:

```
if ((state = = 8) && (L[peakx] > peakI))
{       peakI = L[peakx]; eyex = peakx; eyey = y;
        }
}
```

When an entire image has been scanned, then a non-zero "peakl" indicates a bull's-eye was found adjoining pixel l[eyex][eyey]. Alternately, in the case of a continuously flowing image, acquisition should be terminated a suitable number of rows (e.g., half the size of the image buffer) past the most recent updating of "peakl". This is the number "N" referred to in connection with block 308 above. The current invention utilizes the second acquisition method, by choosing to terminate acquisition N scans after the most recent updating of "peakl". Analysis continues, allowing for a higher peakl, and therefore a more likely candidate for the bull's-eye center to be found subsequently. When all imaged slices have been stored and the finder has been located, the symbol is then ready for decoding with reference to the finder.

While the present invention has been particularly shown and described with reference to the embodiments illustrated in the drawing, one skilled in the art will understand that various changes in detail may be effected therein without departing from the spirit and scope of the invention as recited by the claims.

What is claimed is:

1. A method for asynchronously acquiring and storing a decodable representation of 1D or 2D bar code symbol using a hand-held bar code reader of the type which is adapted to image a 1D slice of said symbol, and to produce a digital representation of said slice, including the steps of:

provinding in said reader a memory space for storing the digital representations of a plurality of said slices;

moving said reader across said symbol while imaging a succession of 1D slices thereof;

producing from said succession of imaged slices a succession of digital representations thereof, including a timercount representation and a bit image representation of said each imaged slice;

storing said digital representations in said memory space substantially in real time;

continuing said storing step until the number of stored representations is sufficient to allow the data encoded in said symbol to be determined with reference to said stored representations.

2. The method of claim 1 including the further steps of: examining successive digital representations, substantially as they occur, and:

(i) for 1D symbols, attempting to decode such symbols with reference to one or more timercount representations thereof;

(ii) for 2D symbols, examining successive ones of the bit image representations of said symbol to locate and identify a finder pattern for said symbol and, if a finder pattern is located and identified, attempting to decode such symbols with reference to the bit image representations stored in said memory space.

3. The method of claim 1 in which said bar code symbol may be a 1D stacked bar code symbol that includes plurality rows of decodable elements, including the further step of determining whether said symbol is a 1D stacked symbol and, if said symbol is a 1D stacked symbol, repeating the decoding step until enough of the rows of the 1D stacked symbol have been decoded to assemble a complete message.

4. The method of claim 2 in which the step of examining successive ones of the bit image representations for a finder pattern includes the steps of;

(i) storing a plurality of finder identifying algorithms, each finder identifying algorithm being of a type suitable for identifying a respective type of finder pattern;

(ii) executing said finder identifying algorithms one after another to determine which of said finder patterns is used in said symbol; and (iii) discontinuing the storing of additional bit image representations when the number of bit image representations stored in said memory space is sufficient to permit the data stored in said memory space to be decoded with reference to the finder pattern used by said symbol.

5. The method of claim 4 in which one of said finder identifying algorithms is an algorithm which includes the steps of:

deriving, from successive bit image representations, sets of numbers which are indicative of the degrees of isolation of the bits of said bit image representations, and comparing successive ones of said sets of numbers to identify the bit image representation having bits with the highest degree of isolation.

6. The method of claim 4 in which said finder identifying algorithms include a first algorithm for identifying finder patterns of the central type, a second algorithm for identifying finder patterns of the waistband type, and a third algorithm for identifying finder patterns of the peripheral type.

7. The method of claim 1 in which the step of storing successive bit image representations is performed on a first in-first out basis, whereby predetermined sets of successive bit image representations may be examined and compared, substantially in real time, for symbol structures which cannot be identified with reference to a single bit image representation.

8. The method of claim 4 including the step, after said discontinuing step, of reorganizing said bit image representations in order to facilitate the decoding thereof.

9. The method of claim 4 including the step, after said discontinuing step, of reorganizing said bit image representations to form an image of the bar code symbol in which the bits of the bit image representations are located approximately in their true relative positions with respect to said finder pattern.

10. A method for asynchronously acquiring and storing a decodable representation of a 1D or 2D bar code symbol using a hand-held bar code reader of the type which includes a 1D image sensor and which is adapted to image a 1D slice of said symbol and to produce at least two types of digital representation of said slice, including the steps of:

moving said reader across said symbol while imaging a succession of 1D slices thereof;

producing from said slices a succession of digital representations thereof, said digital representations including both timercount and bit image representations of said slices;

examining said digital representations substantially as they occur to determine if the symbol can be decoded as a 1D symbol and, if it can be decoded as a 1D symbol, decoding said symbol as a 1D symbol with reference to at least said timercount representations thereof, and, if it cannot be decoded as a 1D symbol, examining sets of said digital representations to locate and identify a 2D finder pattern for said symbol and, when said finder pattern has been located and identified, decoding said symbol as a 2D symbol with reference to the finder pattern and at least said bit image representations thereof.

11. The method of claim 10 in which said bar code symbol may be a 1D stacked bar code symbol that includes a plurality of rows of decodable elements, including the further step of determining whether said symbol is a 1D stacked symbol and, if said symbol is a 1D stacked symbol, repeating the decoding step until enough of the rows of the 1D stacked symbol have been decoded to assemble a complete message.

12. The method of claim 10 in which the step of examining sets of the digital representations for a finder pattern includes the steps of;
(i) storing a plurality of finder identifying algorithms, each finder identifying algorithm being of a type suitable for identifying a respective type of finder pattern;
(ii) executing said finder identifying algorithms one after another to determine which of said finder patterns is used in said symbol; and
(iii) continuing to produce digital representations until the number of digital representations is sufficient to permit the symbol to be decoded.

13. The method of claim 12 in which one of said finder identifying algorithms is an algorithm which includes the steps of:
deriving, from successive bit image representations, sets of numbers which are indicative of the degrees of isolation of the bits of said bit image representations, and
comparing successive ones of said sets of numbers to identify the bit image representations having bits with the highest degree of isolation.

14. In a hand-held bar code reader for asynchronously acquiring and storing a decodable representation of a 1D or 2D bar code symbol, said reader being of the type having a 1D image sensor for receiving an image of a slice of said symbol and generating an output signal that varies in accordance with the data content of said slice, and processing circuitry for converting said output signal into a digital representation of said slice, in combination:
programmed control means responsive to said image sensor and said processing circuitry for producing digital representations of successive slices of said symbol as said reader is moved asynchronously across said symbol, said digital representations including both timercount and bit image representation of said successive slices;
a memory space for storing the digital representations of said succession of slices substantially in real time;
wherein said programmed control means is programmed to discontinue the storing of said digital representations when the number of said representations is sufficient to allow the data encoded in said symbol to be determined with reference to said memory space.

15. The bar code reader of claim 14 in which said programmed control means includes a central processor for controlling the generation of said digital representations in accordance with a stored program, and DMA circuitry for controlling the storing of said representations in said memory space.

16. The bar code reader of claim 14 in which said stored program is a stored program which examines said digital representations substantially in real time to determine whether the symbol being imaged can be decoded as a 1D symbol and, if it can be decoded as a 1D symbol, decoding said symbol without searching for a finder pattern and, if it cannot be decoded as a 1D symbol, examining said digital representations to identify which of a plurality of possible finder patterns is used therein and, when said finder has been identified, decoding the symbol with reference to said finder pattern.

17. The bar code reader of claim 16 in which said program is arranged to determine whether the 1D symbol is a stacked linear symbol or a symbol and, if it is a stacked symbol, to decode each tier of the stacked symbol until enough data to construct a complete message is obtained.

18. The bar code reader of claim 16 in which said program includes a plurality of finder identifying component programs each adapted to identify a respective one of said possible finder patterns, and a program for sequentially applying said component programs to said digital representations and determining the component program which most nearly corresponds to the finder pattern used by said symbol.

19. The bar code reader of claim 16 in which said finder identifying component programs include a first component program for identifying finder patterns of the central type, a second component program for identifying finder patterns of the waistband type, and a third component program for identifying finder patterns of the peripheral type.

20. The bar code reader of claim 18 in which one of said finder identifying component programs comprises a program which:
derives, from successive digital representations, sets of numbers which are indicative of the degrees of isolation of the digital constituents thereof, and
compares successive ones of said sets of numbers to determine which of said representations has the constituent with the highest degree of isolation.

21. The bar code reader of claim 16 in which said successive digital representations are stored on a first in-first out basis, whereby subsets of successive digital representations may be examined and compared to identify symbol structures which cannot be represented in a single digital representation.

22. The bar code reader of claim 18 in which said program discontinues the storage of digital representations after enough such representations have been produced to enable said symbol to be decoded.

23. A method for asynchronously acquiring and storing a decodable representation of 1D or 2D bar code symbol using a hand-held bar code reader of the type which is adapted to image a 1D slice of said symbol, and to produce a digital representation of said slice, including the steps of:
providing in said reader a memory space for storing the digital representations of a plurality of said slices;
moving said reader across said symbol while imaging a succession of 1D slices thereof;
producing from said succession of imaged slices a succession of digital representations thereof;
storing said digital representations in said memory space substantially in real time, wherein said storing step of storing successive bit image representations is performed on a first in-first out basis so that predetermined sets of successive bit image representations may be examined and compared, substantially in real time, for symbol structures which cannot be identified with reference to a single bit image representation; and
continuing said storing step until the number of stored representations is sufficient to allow the data encoded in said symbol to be determined with reference to said stored representations.

* * * * *